United States Patent
Ekanadham et al.

(10) Patent No.: US 8,285,941 B2
(45) Date of Patent: Oct. 9, 2012

(54) ENHANCING TIMELINESS OF CACHE PREFETCHING

(75) Inventors: Kattamuri Ekanadham, Mohegan Lake, NY (US); Jennifer A. Navarro, Poughkeepsie, NY (US); Il Park, Fishkill, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 12/036,476

(22) Filed: Feb. 25, 2008

(65) Prior Publication Data

US 2009/0216956 A1 Aug. 27, 2009

(51) Int. Cl.
*G06F 12/06* (2006.01)
(52) U.S. Cl. .................. 711/137; 711/E12.01; 711/154
(58) Field of Classification Search .................. 711/137, 711/E12.001

See application file for complete search history.

(56) References Cited

U.S. PATENT DOCUMENTS

| | | | |
|---|---|---|---|
| 6,571,318 B1 * | 5/2003 | Sander et al. ................. | 711/137 |
| 2006/0149935 A1 | 7/2006 | Eickemeyer et al. | |
| 2007/0094453 A1 | 4/2007 | Santhanakrishnan et al. | |

FOREIGN PATENT DOCUMENTS

| | | |
|---|---|---|
| JP | 2004164144 A | 6/2004 |
| WO | 0210923 A2 | 2/2002 |
| WO | 03034229 A1 | 4/2003 |

OTHER PUBLICATIONS

Z/Architecture, Principles of Operation, Sixth Edition, Apr. 2007, Publication No. SA22-7832-05, copyright IBM Corp. 1990-2007, pp. 1-1218.
Tien-Fu Chen et al., Reducing Memory Latency via Non-blocking and Prefetching Caches, ASPLOS-V, Oct. 1992, 11 pages.
John W.C. Fu et al., Stride Directed Prefetching in Scalar Processors, Proceedings of the 25th International Symposium on Microarchitecture 1992, 9 pages.
Doug Joseph et al., Prefetching Using Markov Predictors, IEEE transactions on Computer Systems 1999, pp. 121-133.
Sunil Kim et al., Stride-directed Prefetching for Secondary Caches, International Conference on Parallel Processing, 1997, 8 pages.

(Continued)

*Primary Examiner* — Pierre-Michel Bataille
(74) *Attorney, Agent, or Firm* — Cantor Colburn LLP; John Campbell

(57) ABSTRACT

A system, method, and computer program product for enhancing timeliness of cache memory prefetching in a processing system are provided. The system includes a stride pattern detector to detect a stride pattern for a stride size in an amount of bytes as a difference between successive cache accesses. The system also includes a confidence counter. The system further includes eager prefetching control logic for performing a method when the stride size is less than a cache line size. The method includes adjusting the confidence counter in response to the stride pattern detector detecting the stride pattern, comparing the confidence counter to a confidence threshold, and requesting a cache prefetch in response to the confidence counter reaching the confidence threshold. The system may also include selection logic to select between the eager prefetching control logic and standard stride prefetching control logic.

14 Claims, 6 Drawing Sheets

OTHER PUBLICATIONS

An-Chow Lai et al., Dead-Block Prediction & Dead-Block Correlating Prefetchers, Proceedings of the 28th International Symposium on Computer Architecture, Jul. 2001, 11 pages.

Zhigang Hu et al., TCP: Tag Correlating Prefetchers, Proceedings of the 9th Annual International Symposium on High Performance Computer Architecture, 2003, 10 pages.

Aleksandar Milenkovic et al., "Lazy Prefetching," Proceedings of the IEEE HICSS-98, Mauna Lani, Hawaii, Jan. 6-10, 1998, 2 pages.

Honesty C. Young et al., "An Intelligent I-Cache Prefetch Mechanism," International Conference on Computer Design 1993, 6 pages.

Kaeli, DR., et al., "Selective Prefetching Based on Miss Latency," IBM Technical Distribution Bulletin, Oct. 1993, 2 pages.

* cited by examiner

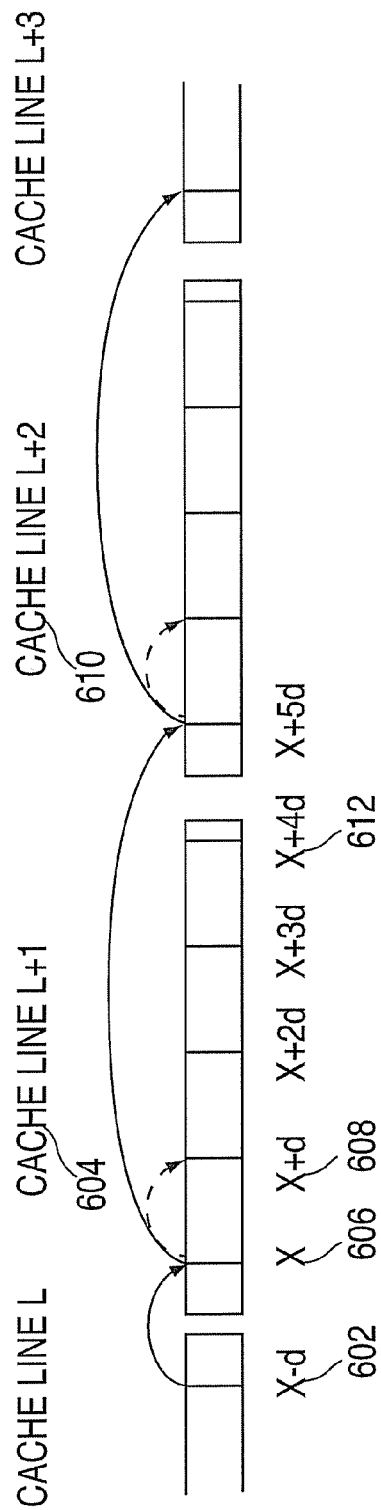
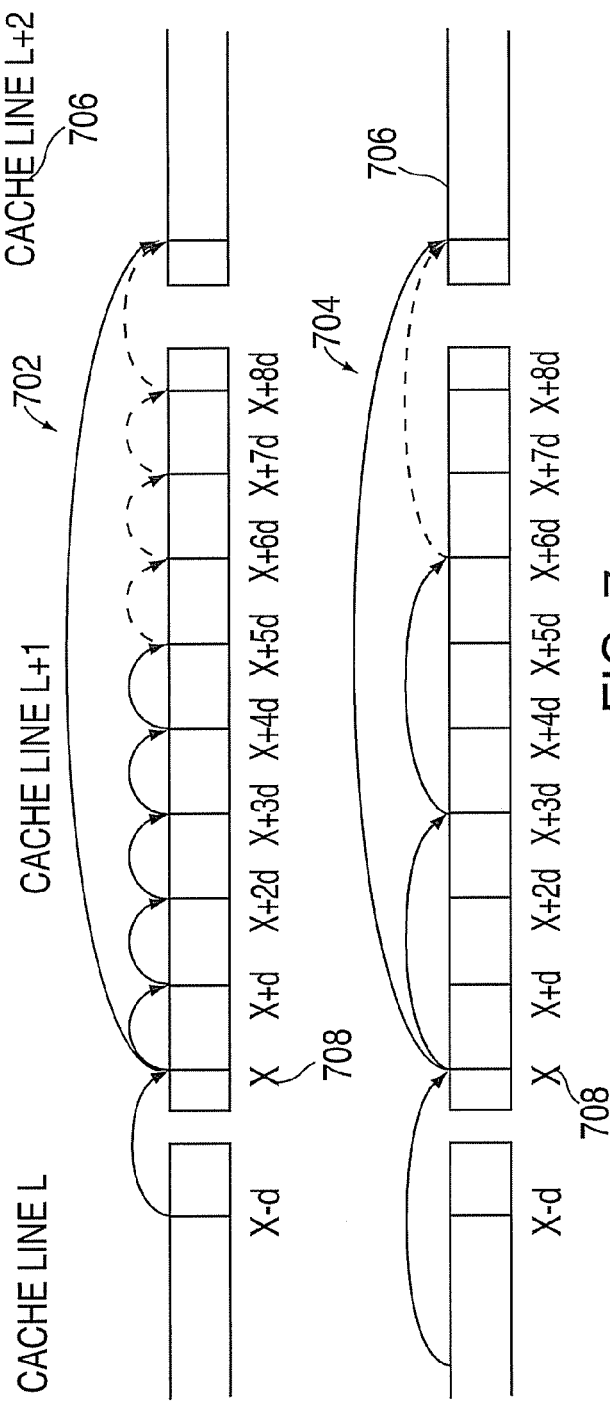

ENHANCING TIMELINESS OF CACHE PREFETCHING

BACKGROUND OF THE INVENTION

This invention relates generally to computer system cache memory access, and more particularly to enhancing timeliness of cache memory prefetching.

Increases in memory access delays have become one of the major concerns to microprocessor designers, particularly as processor pipelines get faster in raw execution speed; performance loss due to local cache misses becomes more significant. Data prefetching is a promising technique to soften such concern. Data prefetching speculates future memory accesses. By bringing predicted-demand-accesses into a target cache earlier than actually demanded, possible cache misses can be reacted to earlier, the target cache can then supply data without accruing the full delays when these cache misses are found only when they are demanded. Each cache miss involves the transfer of a unit of storage, namely a cache line. Each cache line typically includes multiple bytes of data, e.g. 64 or 128 bytes, while an address demanded may target only data at a smaller granularity, such as a single byte or word of data. The data may be instructions or operands for the instructions.

There are two key design elements in the design of data prefetching: what to prefetch and when to prefetch. Existing approaches focus primarily on determining what to fetch through detecting a repeated pattern exhibited by a sequence of memory references. The reference pattern is tracked down and prefetches issue as long as the pattern continues. This approach fails to consider when to prefetch.

FIG. 2 depicts an example of a stride pattern 200 with a stride distance d. When a demand of address X−d 202 occurs, a prefetching attempt with address X 204 happens and a cache line L+1 206 is speculatively brought into the target cache prior to the demand access for address X 204. When a demand for address X 204 occurs, a prefetching attempt with address X+d 208 happens. However, the attempt becomes void, because the address X+d 208 is mapped to the same cache line as the current demand access for address X 204. The prefetching attempt for the next cache line L+2 210 is finally made when the demand access steps through addresses X+2d 212 and X+3d 214, and reaches address X+4d 216. The effectiveness of prefetching for the cache line L+2 210 depends on how many cycles take place between the access to addresses X+4d 216 and X+5d 218. It is often true that time slack between two accesses (X+4d 216 and X+5d 218) is not enough to hide the memory latency if the cache line L+2 210 is not in the target cache. This conventional approach to prefetching is referred to herein as "standard stride prefetching".

A conventional mechanism of multiple prefetch degrees may lessen the timing issue. Sometimes, the prefetch degree is also referred to as prefetch depth. FIG. 3 illustrates a case of three-degrees of prefetching that is applied to the reference stream of FIG. 2. When a demand access X−d 302 happens, a prefetch engine issues not only the cache line L+1 304 but also L+2 306 and L+3 308 at the same time. This approach brings the cache lines L+2 306 and L+3 308 into the target cache earlier than the standard stride prefetching described in reference to FIG. 2. However, the effectiveness of this scheme is challenged by the prefetching accuracy, as many bytes of data that are prefetched may not be needed.

As shown in FIG. 3, there are many speculations involved to bring the cache line L+2 306 and L+3 308 into the target cache because there may not be enough evidence to show that the reference stream actually extend to the cache line L+2 306 and L+3 308. One of the biggest drawbacks of data prefetching is not late prefetching but inaccurate prefetching. Inaccurate prefetching can hurt system performance for multiple reasons. For example, inaccurate prefetched data can kick out useful cache blocks (either demand blocks or accurate prefetched blocks) while they are still needed. Such premature replacement of useful blocks increases not only cache misses but also bus traffic because the system needs to bring them back into the cache. Inaccurate prefetching occupies the bus while transferring data from lower-level caches (caches that are further from the processor and closer to memory) into the target cache (caches that are closer to the processor and further from memory). Meanwhile, useful demanded blocks cannot use the bus, resulting in a delivery delay.

In summary, the multiple-degrees of prefetching trades off accuracy with timing, which can be problematic, especially when the size of the target cache is tight compared to what major workloads require, that is the most common case for both uniprocessor and multiprocessor. Such a choice can also negatively impact performance when bus bandwidth is very precious, which is the case for a multiprocessor with local caches connected through a shared bus. Accordingly, there is a need in the art to enhance timeliness of cache memory prefetching.

BRIEF SUMMARY OF THE INVENTION

An exemplary embodiment includes a system for enhancing timeliness of cache memory prefetching in a processing system. The system includes a stride pattern detector to detect a stride pattern for a stride size in an amount of bytes as a difference between successive cache accesses. The system also includes a confidence counter. The system further includes eager prefetching control logic for performing a method when the stride size is less than a cache line size. The method includes adjusting the confidence counter in response to the stride pattern detector detecting the stride pattern, comparing the confidence counter to a confidence threshold, and requesting a cache prefetch in response to the confidence counter reaching the confidence threshold. The system may also include selection logic to select between the eager prefetching control logic and standard stride prefetching control logic.

Another exemplary embodiment includes a method for enhancing timeliness of cache memory prefetching in a processing system. The method includes executing eager prefetching control logic to perform a method when a stride size is less than a cache line size. The executing eager prefetching control logic method includes adjusting a confidence counter in response to a stride pattern detector detecting a stride pattern for the stride size in an amount of bytes, comparing the confidence counter to a confidence threshold, and requesting a cache prefetch in response to the confidence counter reaching the confidence threshold. The method for enhancing timeliness of cache memory prefetching may also include executing prefetching selection logic to select between the eager prefetching control logic and standard stride prefetching control logic.

A further exemplary embodiment includes a computer program product for enhancing timeliness of cache memory prefetching in a processing system. The computer program product includes a computer-readable storage medium for storing instructions for executing eager prefetching control logic when a stride size is less than a cache line size as a method of: adjusting a confidence counter in response to a stride pattern detector detecting a stride pattern for the stride size in an amount of bytes, comparing the confidence counter to a confidence threshold, and requesting a cache prefetch in response to the confidence counter reaching the confidence threshold. Prefetching selection logic may select between the eager prefetching control logic and standard stride prefetching control logic.

BRIEF DESCRIPTION OF THE DRAWINGS

Referring now to the drawings wherein like elements are numbered alike in the several FIGURES:

FIG. 6 illustrates an example of eager prefetching using a confidence counter;

FIG. 7 illustrates examples of eager prefetching with differing stride lengths.

DETAILED DESCRIPTION OF EXEMPLARY EMBODIMENTS

An exemplary embodiment of the present invention provides eager prefetching of data from cache memory to enhance timeliness of cache memory prefetching. System bandwidth can be improved through increasing the accuracy of prefetching, thus avoiding cache misses. This approach to prefetching is referred to herein as "eager prefetching", as opposed to standard stride prefetching that prefetches based on a constant stride on top of a demand access. In an exemplary embodiment, eager prefetching employs a confidence counter to monitor for instances of a constant stride size for cache memory accesses. When the confidence counter reaches a predefined threshold, aggressive prefetching is performed, since there is a high degree of confidence that subsequent fetches will follow the detected pattern. System performance may be further enhanced using selection logic to determine when to apply eager prefetching versus standard stride prefetching. The selection logic may support configurable predefined limit values to modify performance characteristics.

Figure 1:
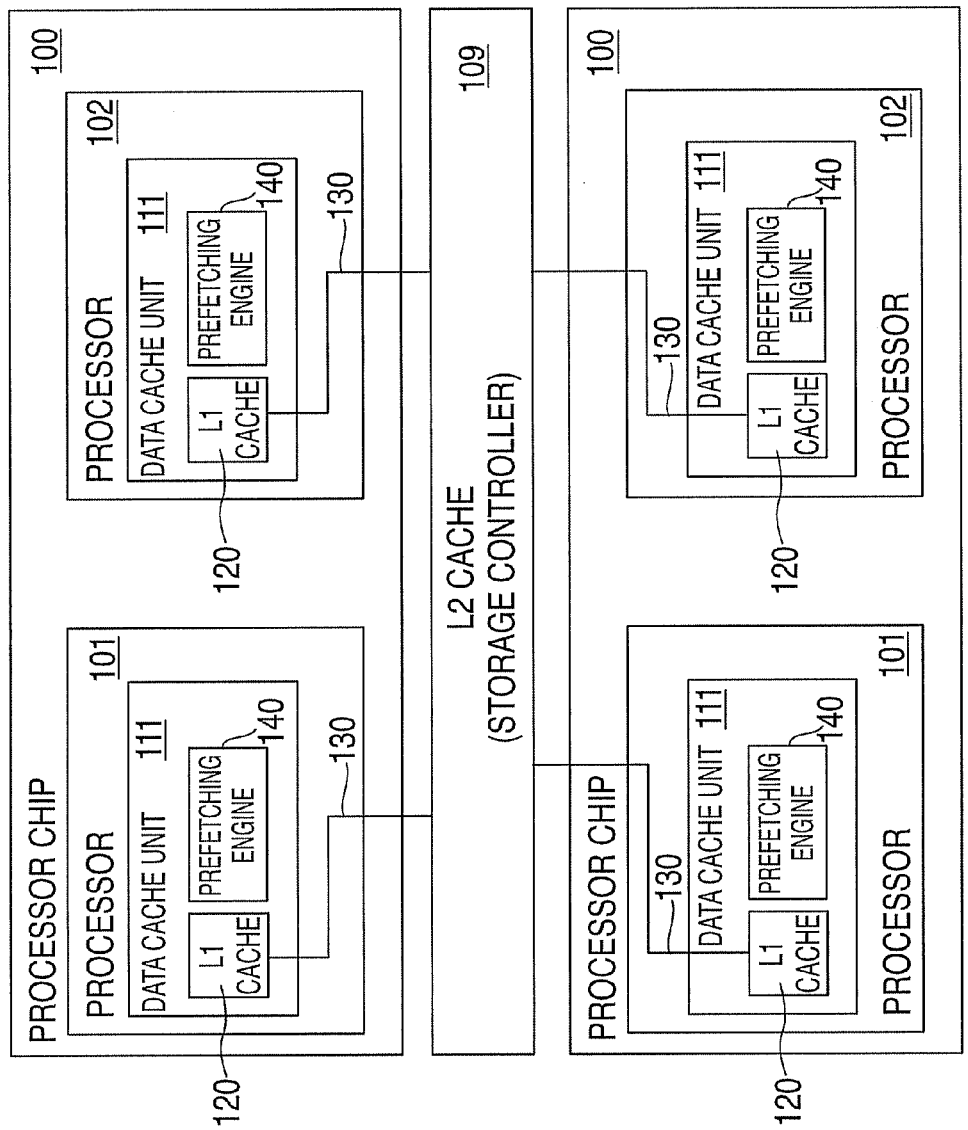
FIG. 1 is a block diagram of a multi-processor (MP) environment that may be implemented by an exemplary embodiment of the present invention.
Figure 2:
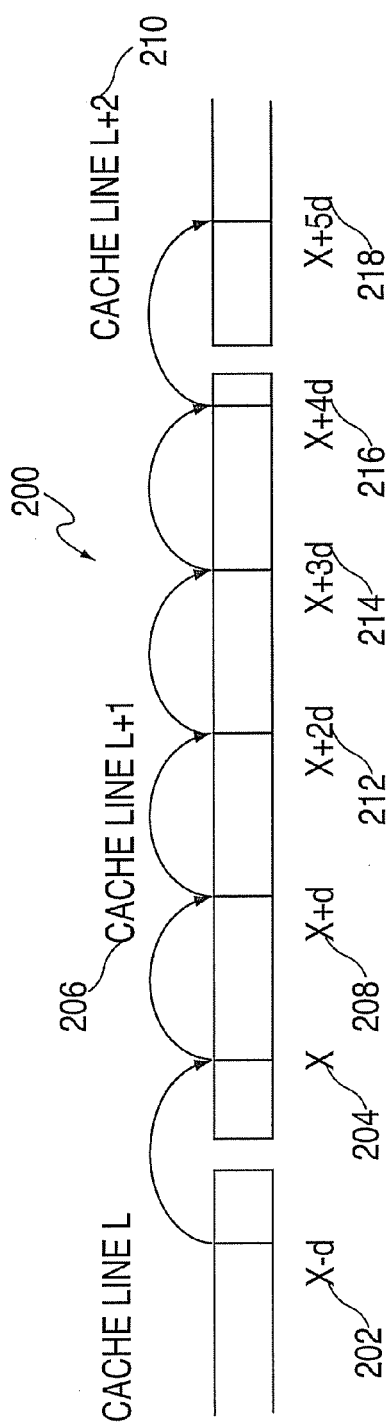
FIG. 2 illustrates a prior art example of a stride pattern implementing traditional stride-based prefetching.
Figure 3:
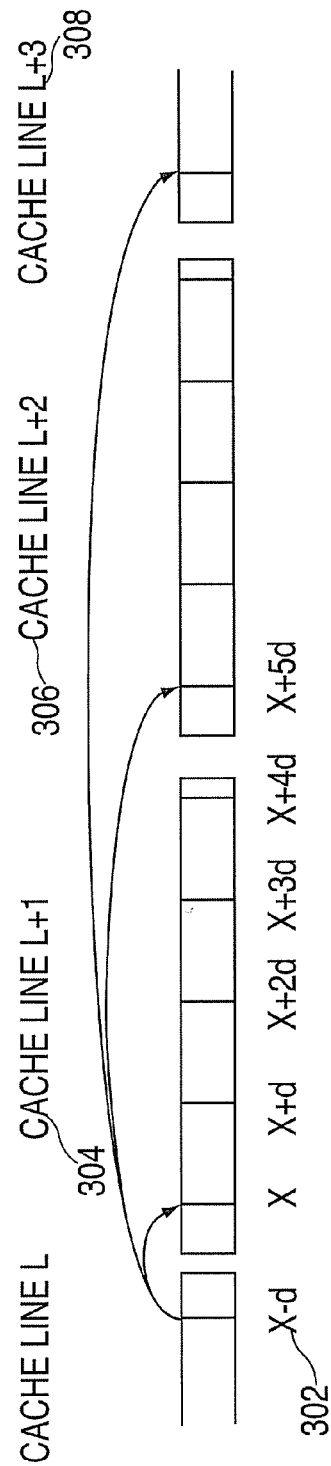
FIG. 3 illustrates a prior art example of multiple-degree prefetching.

Turning now to the drawings in greater detail, it will be seen that in FIG. 1 a multi-processor system is depicted. It will be understood that the system includes other components and design units known in the art that are not depicted in FIG. 1. The system includes two processor chips 100 and a storage controller (SC) 109, which also serves as level-2 (L2) cache. Each processor chip 100 includes two processors 101 and 102, which each further contain a data cache unit (DC) 111. Inside the DC 111 there is a level-1 (L1) data cache 120 for holding recently used cache lines. The processor 101 also includes a prefetching engine 140. The prefetching engine 140 may be incorporated with the DC 111 or located elsewhere. In an alternate exemplary embodiment, the prefetching engine 140 is incorporated in a uniprocessor system.

Between the DC 111 and the SC 109, there are communication buses 130 for handling cache access requests. Although the system of FIG. 1 depicts a dedicated interface between the SC 109 and each DC 111, these interfaces may be shared among processors on processor chip 100. The DC 111, upon a cache miss, sends a request through interface 130 to the L2 cache (which also serves as the SC) 109 demanding a cache line. The SC 109 returns requested data through interface 130 back to DC 111.

Figure 4:
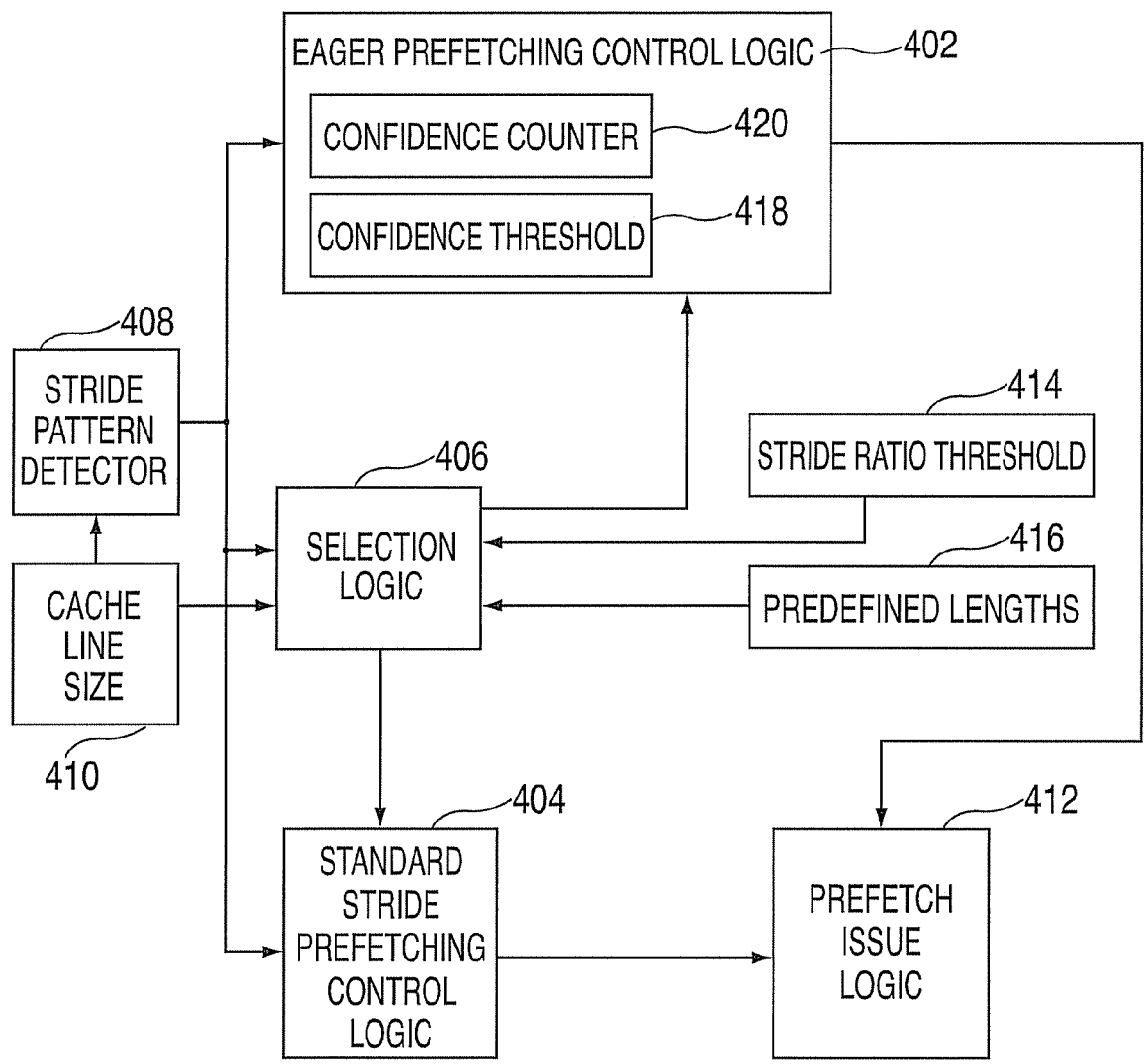
FIG. 4 illustrates the prefetching engine of FIG. 1 in greater detail in accordance with an exemplary embodiment of the present invention.

FIG. 4 depicts further details of the prefetching engine 140 of FIG. 1. The prefetching engine 140 may include eager prefetching control logic 402, standard stride prefetching control logic 404, and selection logic 406. Alternatively, the prefetching engine 140 may contain the eager prefetching control logic 402 and omit the standard stride prefetching control logic 404 and selection logic 406. The prefetching engine 140 also includes a stride pattern detector 408 to detect access patterns in an amount of bytes as a difference between successive cache accesses, e.g., sequentially reading 4-byte words on 16-byte boundaries. Cache line size (CL) 410 information may be provided to the stride pattern detector 408 and the selection logic 406 to indicate the number of bytes in each line of cache memory being accessed. The prefetching engine 140 further includes prefetch issue logic 412 to issue a prefetch access to a line from cache memory (e.g., L1 cache 120 of FIG. 1) as requested by the eager prefetching control logic 402 or the standard stride prefetching control logic 404. The prefetching engine 140 may include configurable values, such as a stride ratio threshold 414 and one or more predefined lengths 416. The eager prefetching control logic 402 can also include a configurable value for confidence threshold 418 associated with confidence counter 420.

Figure 5:
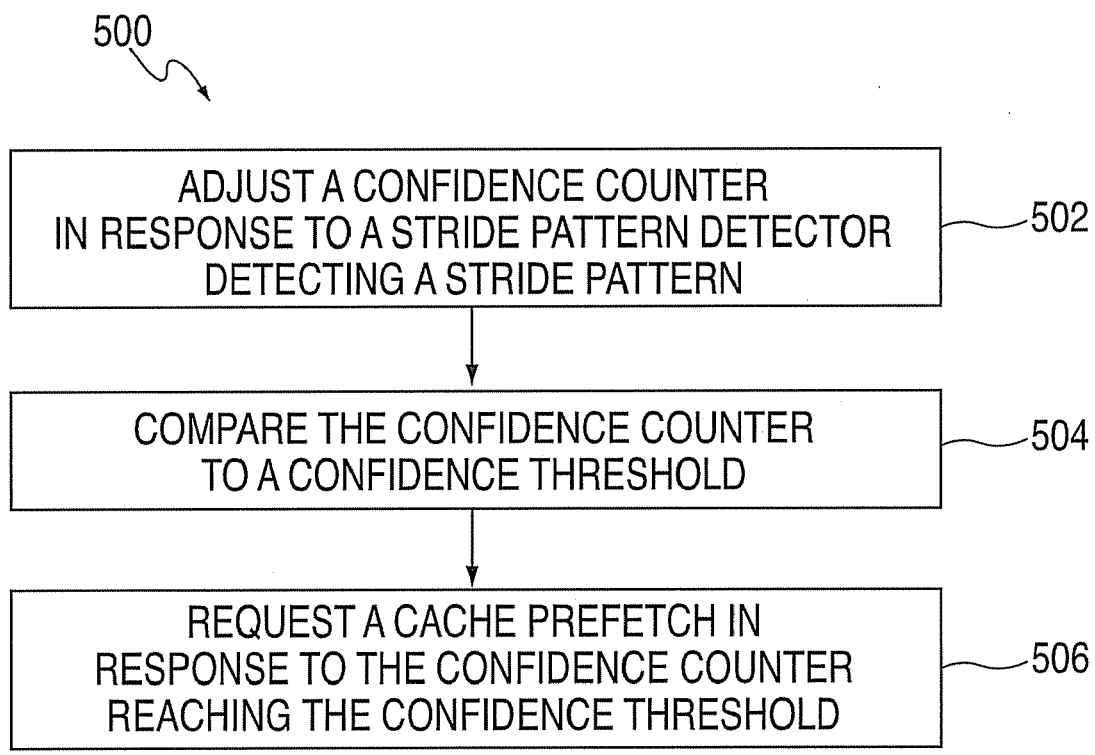
FIG. 5 depicts a process for enhancing the timeliness of cache memory prefetching using eager prefetching in accordance with an exemplary embodiment of the present invention.

FIG. 5 depicts a process 500 for enhancing the timeliness of cache memory prefetching using the eager prefetching control logic 402 in accordance with an exemplary embodiment and described in reference to FIGS. 4 and 6. At block 502, the eager prefetching control logic 402 adjusts the confidence counter 420 in response to the stride pattern detector 408 detecting a stride pattern for multiple access attempts to cache memory. In an exemplary embodiment, the stride size of the stride pattern is an amount of bytes less than the cache line size. The confidence counter 420 can be incremented or decremented depending upon implementation. An example of eager prefetching for a series of cache memory accesses is depicted in FIG. 6.

When a demand X−d 602 occurs, cache line L+1 604 is prefetched in similar fashion as the standard stride prefetching control logic 404 would to request the next sequential access. When a demand targeting address X 606 occurs, address X+d 608 is considered for prefetching. However, the address X+d 608 is mapped to the same cache line L+1 604 as the address X 606. When there is a sufficiently high degree of confidence that the pattern of accesses will continue to the next cache line as determined by comparing the confidence counter 420 to the confidence threshold 418 (depicted in block 504 of FIG. 5), prefetching of the next cache line L+2 610 is performed without waiting until the demand reaches address X+4d 612. Thus, at block 506, the eager prefetching control logic 402 requests a cache prefetch in response to the confidence counter 420 reaching the confidence threshold 418, which in turn triggers the prefetch issue logic 412 to perform the requested prefetch. The confidence counter 420 can be initially reset and be incremented per each detection of a strided access as determined by the stride pattern detector 408. Once the value of the confidence counter 420 reaches the confidence threshold 418, it is stopped. The confidence counter 420 is reset when the eager prefetch is handled, or the stride pattern is discontinued, or a new stride pattern is determined, as may be determined by the stride pattern detector 408. In the case as shown in FIG. 6, the confidence threshold 418 is set at 1. As compared to conventional multi-degree prefetching which blindly prefetches the next multiple cache lines at once, the eager prefetching control logic 402 can improve prefetching accuracy by building and appropriately using confidence information about the reference streams. Note that the prefetch engine 140 can contain multiple sets of confidence counter 420 and confidence threshold 418 each corresponding to a pattern allowed in all concurrent sets of stride patterns that can be detected in the stride pattern detector 408.

Further improvements to enhancing timeliness of cache memory prefetching in a processing system may be realized using the selection logic 406 of FIG. 4. Consider the example depicted in FIG. 7 as two exemplary stride patterns 702 and 704 of reference streams. Assume that the confidence counters associated with both stride patterns 702 and 704 have reached their respective confidence thresholds. Using the eager prefetching control logic 402 of FIG. 4, prefetches of cache line L+2 706 for both stride patterns 702 and 704 may occur upon demand access for address X 708. If prefetching the line L+2 706 is accurate, then the line L+2 706 is accessed by a demand request nine references later in the case of stride pattern 702 and three references later in the case of stride pattern 704. Even if it is known that the line L+2 706 is definitely used later, prefetching that line too early may be detrimental to performance. In some cases, too-early prefetching can be as detrimental to performance as inaccurate prefetching. Therefore, the selection logic 406 can be used to handle different cases, such as the stride patterns 702 and 704.

Figure 8:
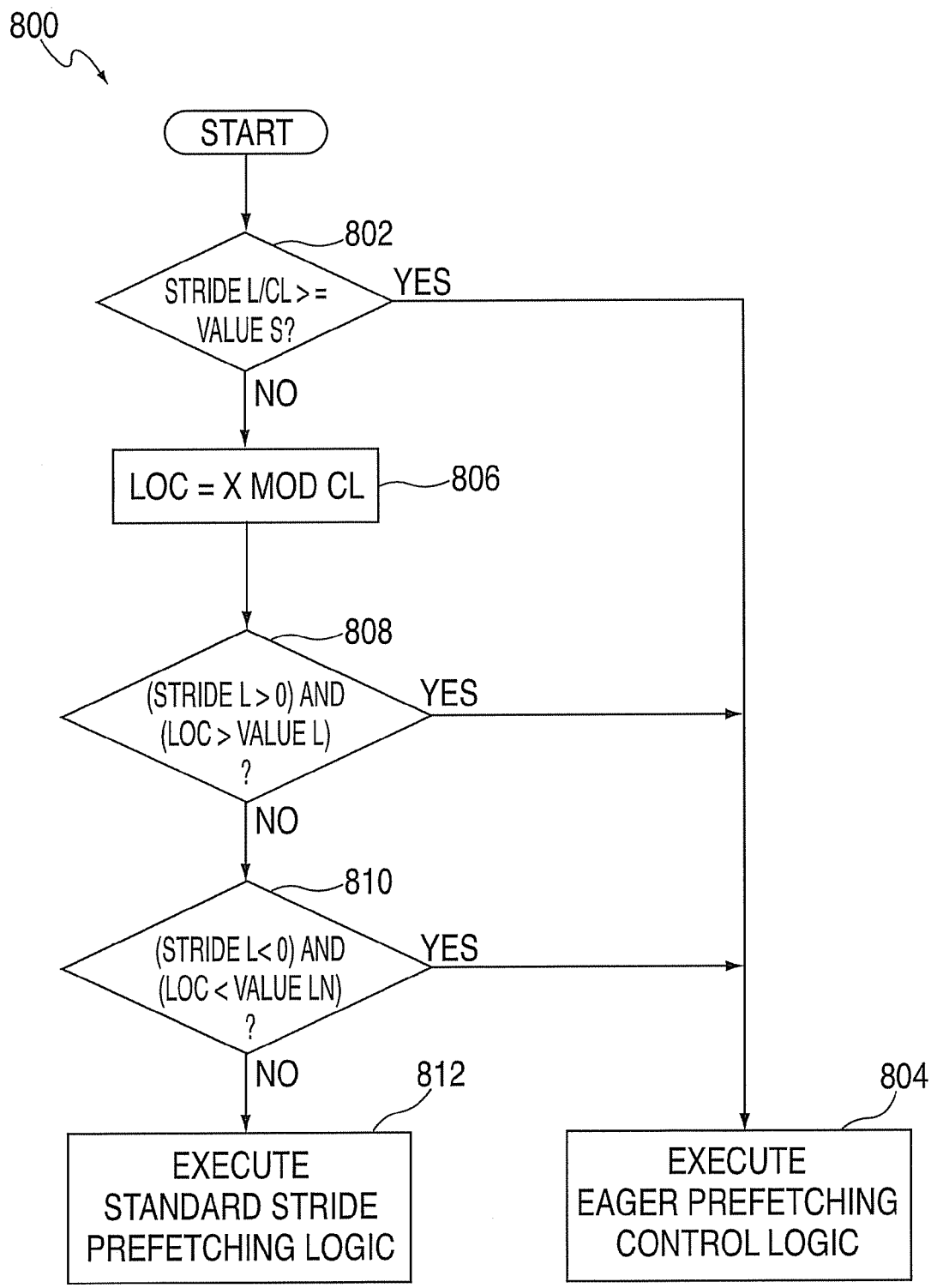
FIG. 8 depicts a process for enhancing timeliness of cache memory prefetching using selection logic in accordance with an exemplary embodiment of the present invention.

Turning now to FIG. 8, a process 800 for enhancing timeliness of cache memory prefetching using the selection logic 406 is depicted in accordance with an exemplary embodiment. In an exemplary embodiment, the selection logic 406 determines whether to select the eager prefetching control logic 402 or the standard stride prefetching control logic 404 to control prefetching requests. At block 802, selection logic 406 compares stride size (strideL) to the cache line size (CL). If the ratio of the strideL over the CL (e.g., CL 410 of FIG. 4) is beyond a predefined value (valueS, also referred to as the stride ratio threshold 414 of FIG. 4, can be of a fraction less than 1), then the eager prefetching control logic 402 is executed at block 804, which prefetches the next cache line or the cache line at the next stride (when strideL is larger than CL) if there is enough confidence. If the ratio is not beyond the valueS, the current demand access address X is determined within its cache line. Block 806 may perform this determination as loc=X modulo CL. If the demand access for address X is close to the end of the cache line striding positive or near the beginning of the cache line striding negative, which is determined based on a predefined length value (valueL and valueLN, also referred to as one or more of the predefined lengths 416 of FIG. 4), then the eager prefetching control logic 402 is executed. Blocks 808 and 810 handle cases where the stride is positive, i.e., strideL>0, and where the stride is negative, i.e., strideL<0. The predefined lengths 416 can include valueL and valueLN as separate limits for positive versus negative strides. To conserve resources, a single valueL can be used for both positive and negative strides, for instance, a value near the middle of the cache line. If the conditions of blocks 802, 808, or 810 are not met, then block 812 executes the standard stride prefetching control logic 404 to sequentially prefetch the next stride as each stride is encountered.

In summary, the selection logic 406 selects the eager prefetching control logic 402 to execute in response to determining that the ratio of stride length (strideL) to cache line size (CL 410) meets or exceeds the stride ratio threshold 414. The stride length may be determined by the stride pattern detector 408. The selection logic also selects the eager prefetching control logic 402 to execute in response to determining that a demand access location is within one of the predefined lengths 416 from a transition to another cache line, where positive and negative values of the strideL are supported. The selection logic 406 selects standard stride prefetching control logic 404 to execute in response to determining that the ratio of strideL to CL 410 is less than the stride ratio threshold 414 and a demand access location is not within one of the predefined lengths 416 from a transition to another cache line. The valueS (e.g., stride ratio threshold 414) and valueL/valueLN (e.g., predefined lengths 416) can be constant values or can be function of the confidence counter 420 or any other system parameters including prefetching parameters.

Technical effects and benefits include enhancing timeliness of cache memory prefetching in a processing system. Using a confidence counter and a confidence threshold, eager prefetching confirms that a stride pattern has been detected for multiple occurrences before aggressively prefetching data when the stride is less than a cache line size. This improves the prefetching timing without hurting prefetch accuracy or increasing bus traffic as the conventional mechanisms do such as multiple-degree of prefetching. Unlike approaches such as tag-correlation prefetching or dead-block prefetching, the invention as described herein does not require substantial hardware resources.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A system for enhancing timeliness of cache memory prefetching in a processing system, the system comprising:
   a stride pattern detector to detect a stride pattern for a stride size in an amount of bytes as a difference between successive cache accesses, the stride size is less than a cache line size;
   a confidence counter;
   prefetching selection logic;
   a separate eager prefetching control logic hardware in communication with the prefetching selection logic;
   a standard stride prefetching control logic hardware in communication with the prefeteching selection logic, the system performing:
      adjusting the confidence counter based on the stride pattern detector detecting the stride pattern;
   comparing the confidence counter to a confidence threshold; and
   requesting, using the separate eager prefetching control logic, a cache prefetch of a cache line x and cache line x+1 based on the confidence counter reaching the confidence threshold;
   performing the cache prefetch of the cache line x using the standard stride prefetching logic hardware, based on each of 1) the confidence counter reaching the confidence threshold, and 2) determining that a ratio of stride length to cache line size is less than a predefined stride ratio threshold and a demand access location is not within a predefined length from a transition to another cache line; and
   performing the cache prefetch of the cache line x and cache line x+1 using the separate eager prefetching control logic hardware based on each of 3) the confidence counter reaching the confidence threshold, and 4) determining that a ratio of stride length to cache line size meets or exceeds the predefined stride ratio threshold.

2. The system of claim 1 wherein the confidence counter is reset in response to the requesting being handled, or the stride pattern detector detecting that the stride pattern has been discontinued or finding a new stride pattern.

3. The system of claim 1 wherein the method performed by the prefetching selection logic further comprises:
   selecting the eager prefetching control logic hardware to execute in response to determining that the ratio of stride length to cache line size is less than the stride ratio threshold and a demand access location is within a predefined length from a transition to another cache line.

4. The system of claim 3 wherein positive and negative values of the stride length are supported with different predefined lengths for the eager prefetching control logic hardware to execute.

5. The system of claim 3 wherein one or more of the predefined length, the stride ratio threshold, and the confidence threshold are configurable.

6. A method for enhancing timeliness of cache memory prefetching in a processing system, the method comprising:
   adjusting a confidence counter based on a stride pattern detector detecting a stride pattern for the stride size in an amount of bytes;
   comparing the confidence counter to a confidence threshold;
   requesting, using a separate eager prefetching control logic hardware, a cache prefetch of a cache line x and a cache line x+1 based on the confidence counter reaching the confidence threshold;
   performing the cache prefetch of the cache line x using standard stride prefetching control logic hardware, based on each of 1) the confidence counter reaching the confidence threshold, and 2) determining that a ratio of stride length to cache line size is less than a predefined stride ratio threshold and a demand access location is not within a predefined length from a transition to another cache line; and
   performing the cache prefetch of the cache line x and a cache line x+1 using the separate eager prefetching control logic hardware, based on each of 3) the confidence counter reaching the confidence threshold, and 4) determining that a ratio of stride length to cache line size meets or exceeds a predefined stride ratio threshold.

7. The method of claim 6 wherein the confidence counter is reset in response to the requesting being handled, or the stride pattern detector detecting that the stride pattern has been discontinued or finding a new stride pattern.

8. The method of claim 6 wherein the method further comprises:
   selecting the eager prefetching control logic to execute in response to determining that the ratio of stride length to cache line size is less than the stride ratio threshold and a demand access location is within a predefined length from a transition to another cache line.

9. The method of claim 8 wherein positive and negative values of the stride length are supported with different predefined lengths for the eager prefetching control logic to execute.

10. The method of claim 8 wherein one or more of the predefined length, the stride ratio threshold, and the confidence threshold are configurable.

11. A computer program product for enhancing timeliness of cache memory prefetching in a processing system, the computer program product comprising:
    a computer-readable storage medium for storing instructions for executing a method comprising:
       adjusting a confidence counter based on a stride pattern detector detecting a stride pattern for the stride size in an amount of bytes;
       comparing the confidence counter to a confidence threshold;
       requesting, using a separate eager prefetching control logic hardware, a cache prefetch a cache line x and a cache line x+1 based on the confidence counter reaching the confidence threshold;
       performing the cache prefetch of the cache line x using standard stride prefetching logic hardware, based on each of 1) the confidence counter reaching the confidence threshold, and 2) determining that a ratio of stride length to cache line size is less than a predefined stride ratio threshold and a demand access location is not within a predefined length from a transition to another cache line; and
       performing the cache prefetch of the cache line x and a cache line x+1 using the separate eager prefetching control logic hardware based on each of 3) the confidence counter reaching the confidence threshold, and 4) determining that a ratio of stride length to cache line size meets or exceeds a stride ratio threshold.

12. The computer program product of claim 11 wherein the confidence counter is reset in response to the requesting being handled, or the stride pattern detector detecting that the stride pattern has been discontinued or finding a new stride pattern.

13. The computer program product of claim 11 wherein the eager prefetching control logic is selected to execute by prefetching selection logic in response to determining that the ratio of stride length to cache line size is less than the stride ratio threshold and a demand access location is within a predefined length from a transition to another cache line.

14. The computer program product of claim 13 wherein positive and negative values of the stride length are supported with different predefined lengths for the eager prefetching control logic to execute.

* * * * *